P. Ball,
Pipe Coupling.
Nº 50,090.    Patented Sep. 26, 1865.
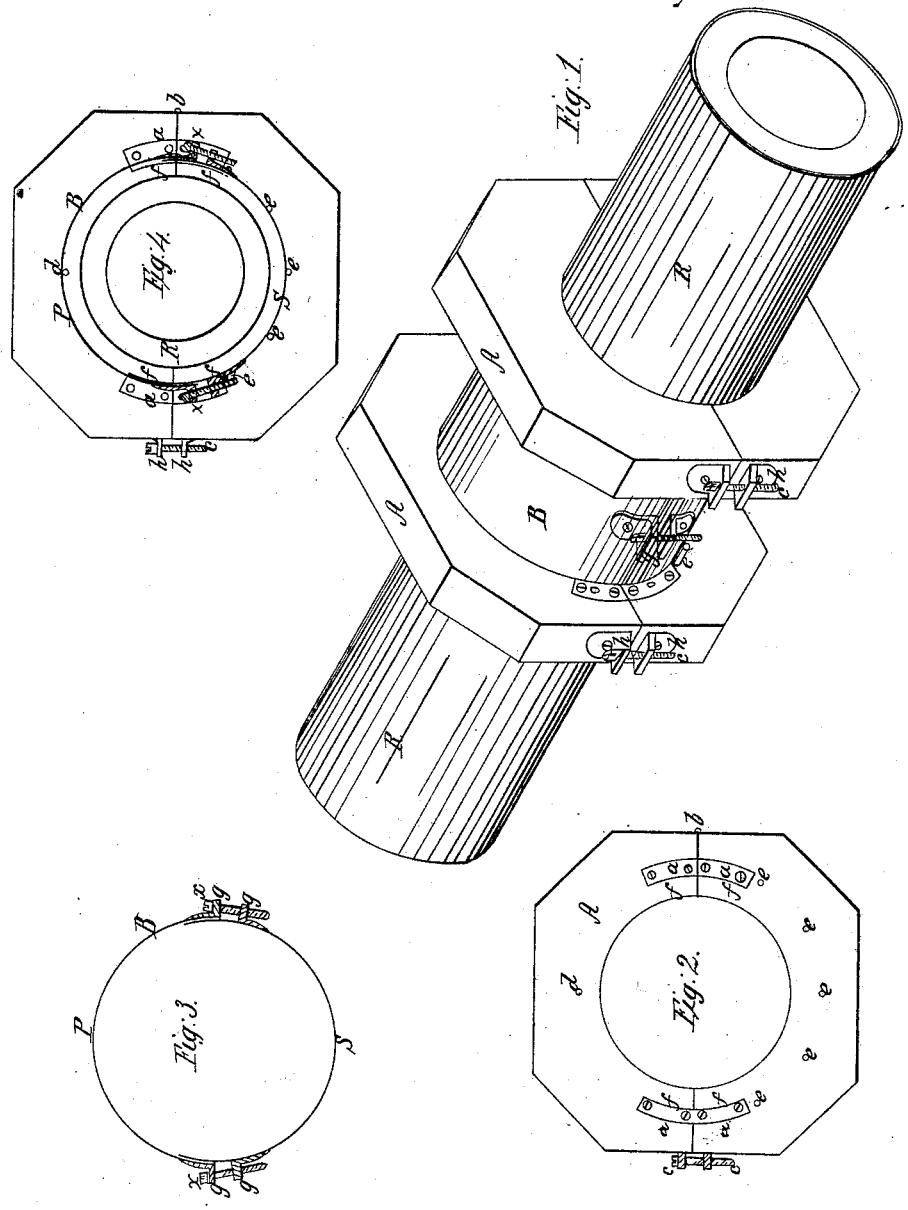
Witnesses;
Geo. E. Bryden
P. E. Fuller
Inventor;
Phinehas Ball

UNITED STATES PATENT OFFICE.

PHINEHAS BALL, OF WORCESTER, MASSACHUSETTS.

IMPROVEMENT IN PIPE-JOINTS.

Specification forming part of Letters Patent No. 50,090, dated September 26, 1865.

*To all whom it may concern:*

Be it known that I, PHINEHAS BALL, of the city and county of Worcester, and Commonwealth of Massachusetts, have invented certain new and useful Improvements in Pressure Sleeve-Joints for Water and other Pipes; and I do hereby declare that the following is a full, clear, and exact description of the same, reference being had to the accompanying drawings, forming a part of this specification, in which—

Figure 1 represents a perspective view of my improvement when applied to the joint and before the guide-clamps A A are removed. Fig. 2 represents a side view of the guide-clamps A A detached from the pipe and joint. Fig. 3 represents an end view of the sleeve-joint B detached, and Fig. 4 represents a central cross-section of the sleeve-joint B as seen in Fig. 1.

Difficulties have heretofore attended the making of sleeve-joints upon cement-lined water-pipes, and especially upon those of larger size, when the joints were required to be practically tight. A second objection to the ordinary method is that there is a liability that the sleeve may not be left, when the joint is finished, in a correct position over the joint in the pipes underneath the sleeve to insure success in the work—that is, the joint in the pipe may be too near one end of the sleeve, instead of in the center, where it should be, or, by careless handling, may not be under the sleeve at all. Then, to make sleeves on very large pipes by the ordinary mode is a task which can only be performed by a very athletic man.

To obviate all these difficulties I make a joint as follows: The pipes R R to be joined, whether cement, iron, wood, lead, or papier-maché, are butted together in the ordinary manner of joining tubes or pipes by a sleeve-joint. After the pipes to be joined are in position, clamps or guides A A are placed around each pipe at equal distances from the joint, and at a distance far enough apart to just admit the sleeve B between them. These clamps A A are made in two parts and hinged on one side, as seen at $b$, and bolted together on the other in such manner as to be easily adjusted to slight inequalities in the pipes, and also to bring sufficient pressure upon the ends of the pipes to prevent injury thereto from pressure brought unequally upon the ends of the pipes by the pressure of the sleeve when its filling is compressed.

Guides $a\ a$ are placed upon the clamps, having projecting circular flanges $f$ upon their inner edges, and which flanges are placed upon the clamps as far from the surface of the pipe as the thickness of the filling of the sleeve is required.

Pins $d$ are placed in the sides of the upper half of clamps A A, as indicated in the drawings, the object of the guides $f$ and pins $d$ being to keep the sleeve, when compressed by the screws $x\ x$, which pass through ears $g$, fastened to both parts P and S of sleeve B, from ever displacing the mortar so as to bring the sleeve in close contact with the pipe. The pins $e\ e\ e$ in the lower half of clamps A A are placed a little farther off from the surface of the pipes than the flanges $f$ and pins $d$, so that when the lower half of the sleeve S is placed in to be filled it will have a proper support and be retained at the required distance from the pipe while the cement is being filled in, the pins $e\ e\ e$ forming a bottom support to the sleeve B, while the flanges $f$ upon the guides $a\ a$ and pins $d$ support the sleeve upon the inside and prevent it from being drawn too closely upon the pipe.

The guide-clamps A A prevent the filling from being forced out laterally from under the sleeve when the parts P and S of sleeve B are drawn together.

The operation is as follows, viz: The clamps A A are first placed upon the pipe the proper distance apart to receive the sleeve. The lower half, S, of the sleeve is then placed between these clamps, resting upon the pins $e\ e$, and the space between the sleeve and pipe filled with the cement from the sides. After the lower half has been filled, mortar may be evenly spread over the top half of the pipe and the upper half of the sleeve applied and screwed down by the screw $x\ x$ until a sufficient compression has been obtained to make the mortar as compact as desired. The lower half of the sleeve is made more than one-half of a circle and the upper half nearly a semicircle, so that the upper half fits over the lower half and makes the joints entirely tight, as indicated in the drawings.

The filling may be of common cement—Portland or Roman—or of a melted composition of bitumen and clay, or asphaltum tempered to the requisite plastic state by heat and an admixture of coal-tar and clay, and be applied while warm in a similar manner as cement, and the pressure applied while the mass is cooling.

The clamps may be made in segments, the number depending upon the size of the pipe, and then attached to a flexible band of iron to permit the segments to conform to the circumference of the pipe, whether elliptical or otherwise.

The inner face of the clamp A A may be lined with some elastic substance—such as leather or gutta-percha—to prevent injury to the pipes when they are screwed up by their screws or bolts c c, which pass through ears h h on the clamps, as fully indicated in the drawings.

After the sleeve B has been applied as above the clamps A A are removed and the metal sleeve B covered with a coating of the filling used, so that no corrosion of the sleeve will take place.

Having described my improved pressure sleeve-joint, what I claim therein as new, and desire to secure by Letters Patent, is—

1. The combination, with the ends of the pipes R R, of the hinged guide-clamps A A.

2. The combination, with the clamps A A, of the flanges f f and pins d d, substantially as and for the purposes set forth.

3. The combination, with the bottom of the clamps A A, of the supporting-pins e e, for sustaining the lower half of the sleeve while being filled, as described.

4. The combination, with the overlapping parts P and S, of the ears g g and screws x x, for the purposes set forth.

PHINEHAS BALL.

Witnesses:
H. L. FULLER,
THOS. H. DODGE.